Dec. 1, 1970  A. R. GERHARD  3,544,891
METHOD AND APPARATUS FOR MEASURING AND ADJUSTING AN
R-C NOTCH FILTER HAVING THIN-FILM RESISTORS
Filed May 9, 1968  10 Sheets-Sheet 1

INVENTOR
A. R. GERHARD,
BY R. P. Miller
ATTORNEY

| DIAL POSITION | COMMON "C" CONNECTED TO: | | | |
|---|---|---|---|---|
| | 1 | 2 | 2' | 4 |
| 0 | | | | |
| 1 | O | | | |
| 2 | | O | | |
| 3 | O | O | | |
| 4 | | O | O | |
| 5 | O | O | O | |
| 6 | | | O | O |
| 7 | O | | O | O |
| 8 | | O | O | O |
| 9 | O | O | O | O |

Fig. 13.

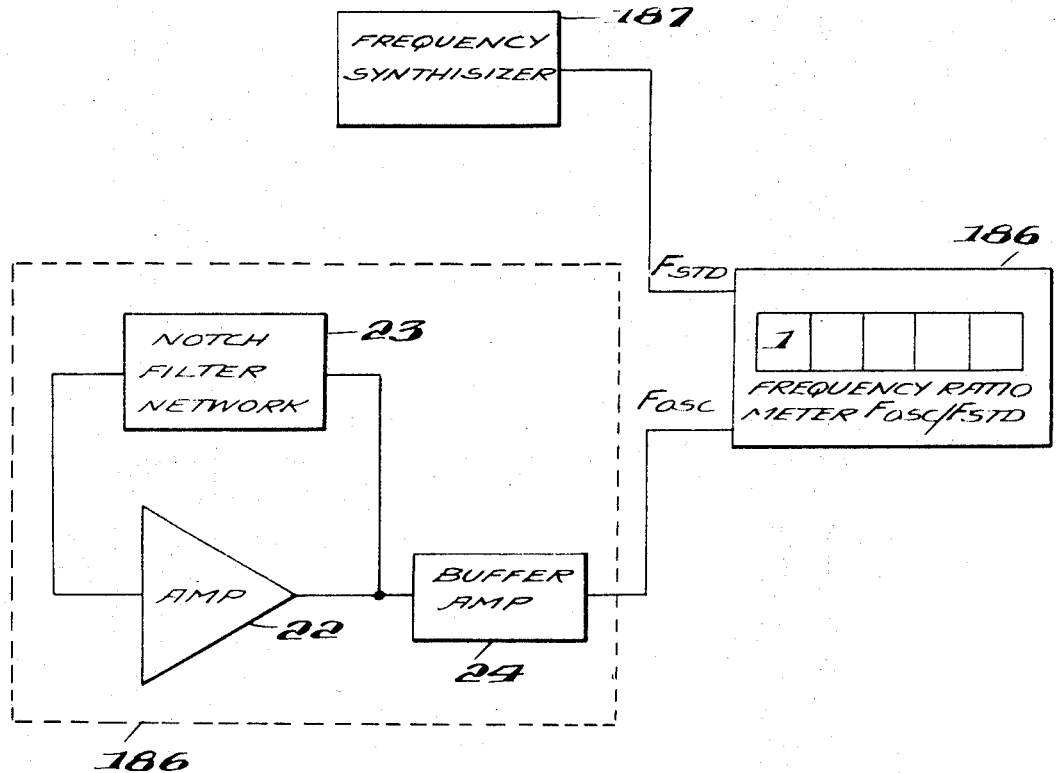
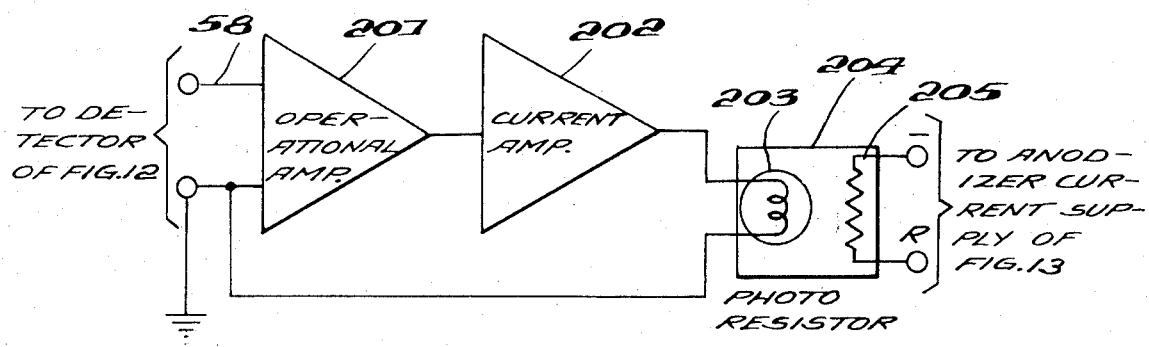

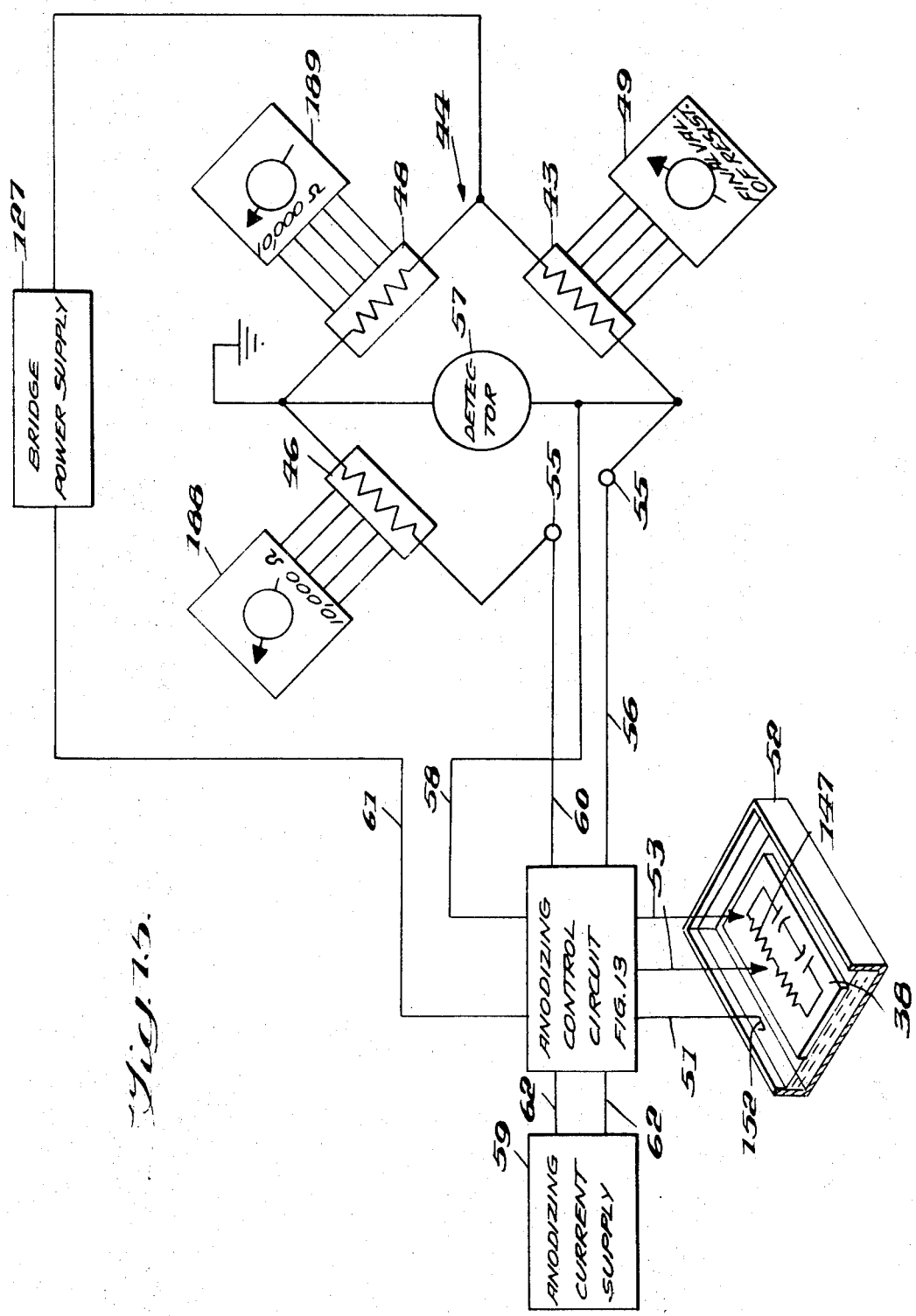

United States Patent Office 3,544,891
Patented Dec. 1, 1970

3,544,891
METHOD AND APPARATUS FOR MEASURING AND ADJUSTING AN R-C NOTCH FILTER HAVING THIN-FILM RESISTORS
Allen R. Gerhard, Fullerton, Pa., assignor to Western Electric Company, Incorporated, New York, N.Y., a corporation of New York
Filed May 9, 1968, Ser. No. 727,972
Int. Cl. G01r 27/00
U.S. Cl. 324—57                                                    10 Claims

ABSTRACT OF THE DISCLOSURE

The notch depth of a notch filter is measured to ascertain the degree of its deviation from a desired value. The measurement is used to program an adjustable Wheatstone bridge which controls a circuit for anodizing a resistor in the filter to adjust the notch depth to the desired value. The deviation of the notch frequency is then measured and a similar technique is used to anodize all the resistors of the filter to adjust the notch frequency to a desired value.

CROSS-REFERENCE TO RELATED APPLICATION

This application is related to co-pending applications Ser. No. 454,890 filed May 11, 1965 and Ser. No. 579,953 filed Sept. 16, 1966 and Ser. No. 727,948, filed May 9, 1968, in the name of F. H. Blitchington, Jr.

BACKGROUND OF THE INVENTION

Field of invention

The invention relates to a method and apparatus for measuring and adjusting the characteristics of an RC notch filter having thin-film resistors. More particularly, the invention relates to a method and apparatus for adjusting the notch depth attenuation of a notch filter and frequency at which the notch occurs.

Description of prior art

A twin-T notch filter attenuates certain frequencies of electrical signals a fixed amount in a notch-like characteristic. The maximum degree of attenuation is known as the notch depth of the filter and the frequency at which maximum attenuation occurs is known as the notch frequency of the filter. Additionally, a notch filter shifts the phase of an incoming signal by 180 degrees at the notch frequency.

In the past, it has been known to employ a notch-filter in the feedback circuit of an amplifier to generate oscillations at the notch frequency of the filter. Further, a number of different circuits have been developed to anodize a thin-film resistor to a predetermined value. However, no satisfactory prior art system has contemplated a measurement of the notch depth and notch frequency of a filter and the use of this measurement to control a facility to anodize the thin-film resistors comprising the filter, in order to economically and precisely adjust the notch depth and frequency to preselected values.

SUMMARY OF THE INVENTION

In one embodiment of the system, an attenuation measuring circuit is used to measure the actual notch depth of the filter and the notch depth is used to obtain a factor by which the value of an attenuation control resistor of the filter must be increased to change the characteristic of the filter so that the notch depth is equal to a design value. The factor is used to control the adjustment of a Wheatstone bridge which is connected to an anodizing circuit. The attenuation control resistor is connected to the anodizing circuit and is anodized until it reaches the value determined by the factor. The bridge then interrupts further anodization.

The notch frequency of the filter is adjusted by placing the filter in an amplifier feedback circuit to form an oscillator and then comparing the oscillation frequency to a design value. The ratio of the two frequencies gives a factor by which each of the resistors in the filter must be increased to shift the oscillation frequency to the design value. The Wheatstone bridge is then set according to the factor to control the anodizing circuit and each of the resistors in the filter are anodized to the proper value.

BRIEF DESCRIPTION OF THE DRAWING

The nature of the present invention and its various advantages and features will appear more fully by referring to the following detailed description in conjunction with the appended drawing, in which:

FIG. 13 is a schematic diagram of an anodizing control circuit constructed in accordance with the invention;

FIG. 14 is a block diagram of a circuit for measuring the frequency deviation of an oscillator in accordance with the invention;

FIG. 15 is, essentially, a block diagram of a circuit for adjusting the notch frequency of a notch filter in accordance with the invention;

FIG. 16 is a block diagram of a circuit for continuous regulation of anodizing current in accordance with the invention; and FIG. 17 is a block diagram illustrating the relationship with which FIGS. 7, 11, 12 and 13 are interconnected with one another.

DETAIL DESCRIPTION BACKGROUND

Figure 1:
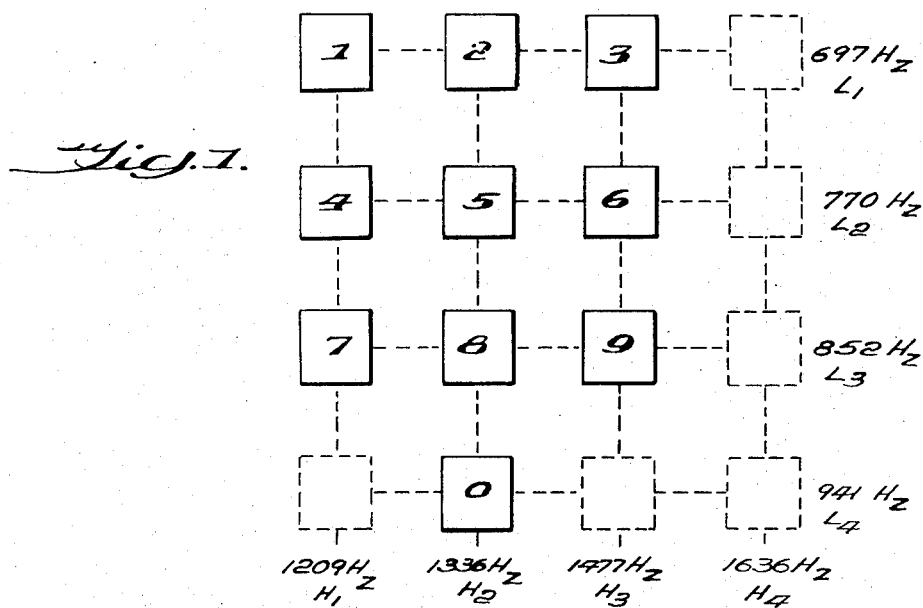
FIG. 1 is a diagram of the arrangement of key buttons on a telephone instrument showing the combinations of two tones which are associated with each digit.

In multi-frequency signalling, as it is used in telephone switching systems, two signals having different, distinct audio frequencies are used to identify each digit as it is selected. The code frequencies are transmitted from a telephone instrument to a central office where they are used to actuate switching circuits and connect the caller to his party. As shown in FIG. 1, when a single push button is depressed, two frequencies, one high and one low, are produced and the combination of frequencies is unique to the digit selected.

Figure 2:
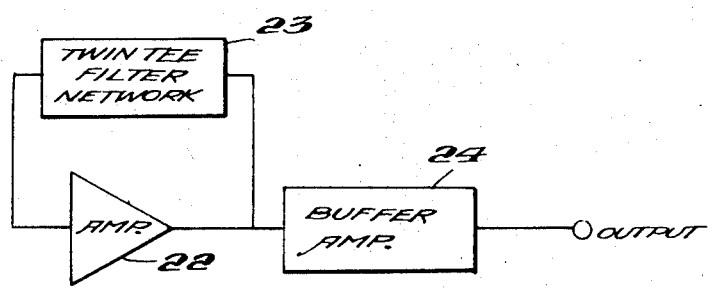
FIG. 2 is a block diagram of an oscillator using a twin-T notch filter of the type used to generate telephone signalling tones.

The frequencies for the code are generated by two audio frequency oscillators, each capable of producing four different frequencies. One oscillator produces the low group of audio frequencies of 697 ($f_a$), 770 ($f_b$), 852 ($f_c$), and 941 ($f_d$) Hz.; the other produces the group of high audio frequencies of 1209 ($f_e$), 1336 ($f_f$), 1477 ($f_g$) and 1636 ($f_h$) Hz. As shown in FIG. 2, each of the oscillators comprise an amplifier 22, having a twin-T filter network 23 connected in a feedback path to generate oscillations. The output of each amplifier 22 is connected to external circuitry through a buffer amplifier stage 24, which serves to isolate the amplifiers 23 from each other and from impedance variations in the external circuitry.

Figure 3:
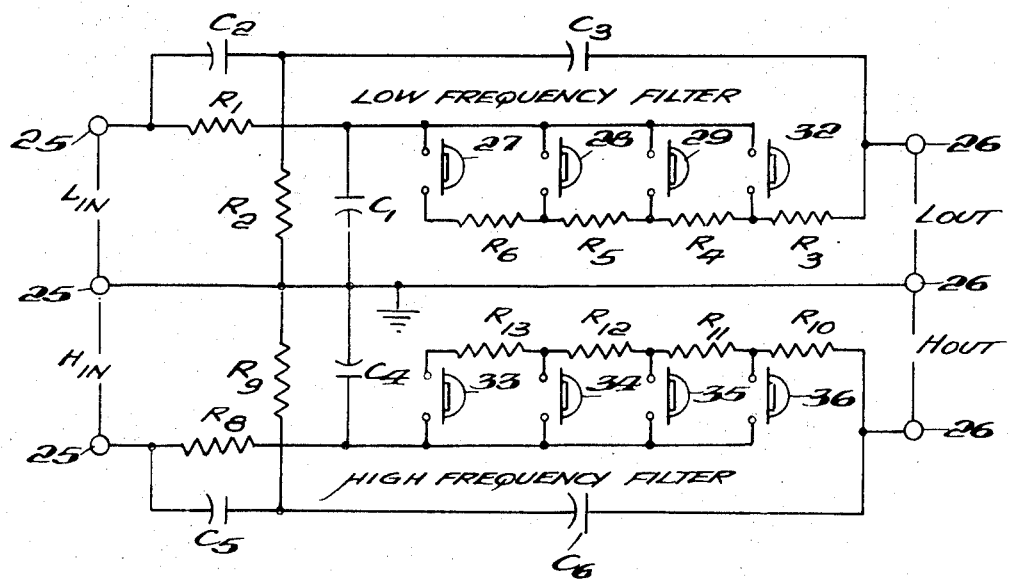
FIG. 3 is a schematic diagram of a notch filter of the type involved in the instant invention.

The twin-T filters 23—23 are also known as RC notch filters and are shown in FIG. 3. The filters include a pair of input terminals 25—25 and a pair of output terminals 26—26 for both the high and low frequency filters. Connected between the input and output terminals, each filter comprises a high-pass T-section of the RC type, parallel connected with an RC low-pass T-section. For example, the low frequency filter of FIG. 3 includes a high-pass T-section composed of two series capacitors C2 and C3 and a shunt resistor R2. The high-pass section is connected in parallel with a low-pass T-section composed of an input resistor R1 in series with an output resistor and a shunt capacitor C1 connected between the two resistors. The value of the output resistor may be varied by closing a selected one of a number of switches 27–32 to connect different series combinations of resistors R3, R4, R5 and R6.

Each filter attenuates signals of one frequency in a spectrum, thereby forming a "notch" in the spectrum at that frequency. As shown in the upper section of FIG. 4, the low frequency filter shown in FIG. 3 demonstrates the characteristics of forming "notches" of maximum attenuation at each of four frequencies. These frequencies are determined by which ones of the output resistors R3, R4, R5 and R6 are connected by operation of the switches 27, 28, 29, 32. Similar attenuation characteristics at four different frequencies are given by the high frequency filter section, shown in FIG. 3.

Figure 4:
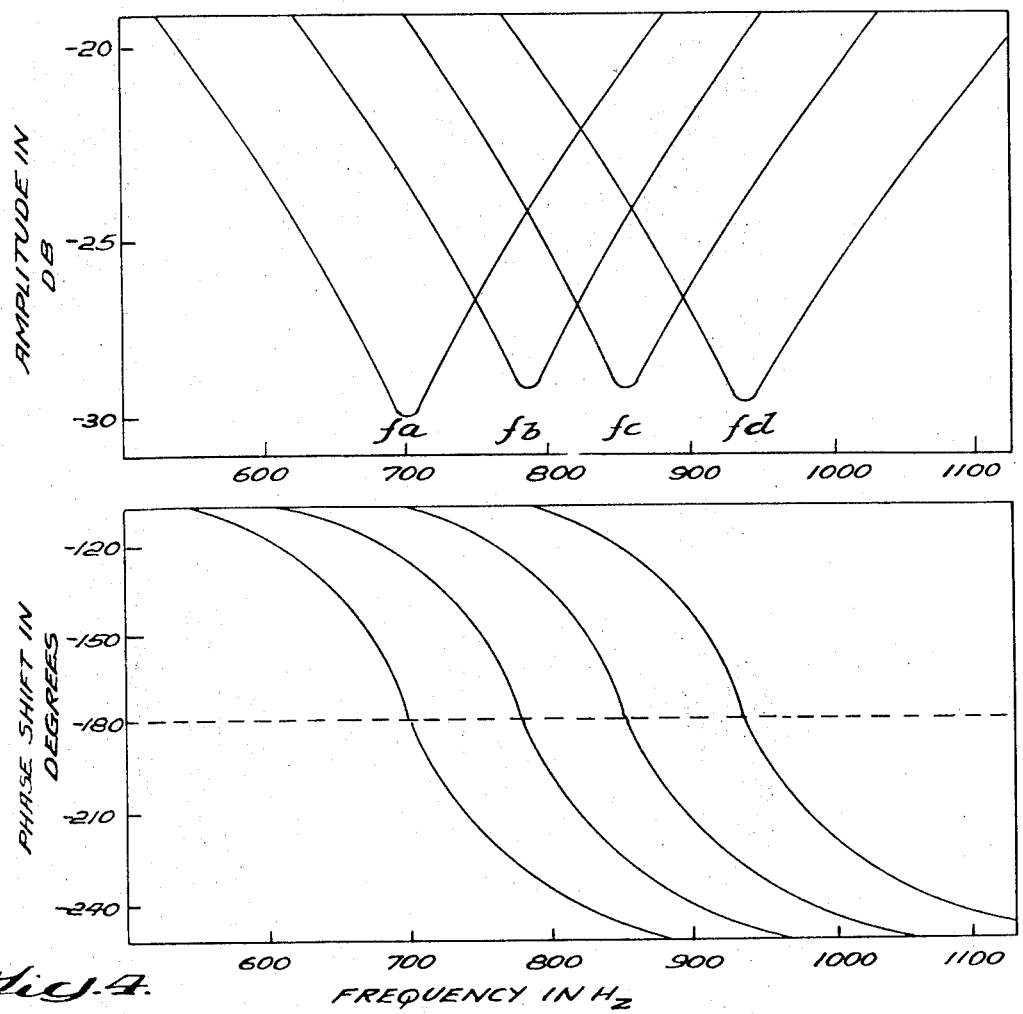
FIG. 4 is a set of curves showing attenuation and phase shift characteristics for the low frequency section of the notch filter of FIG. 3.

An additional characteristic of notch filters, shown in the lower section of FIG. 4, is that they shift the phase of a signal oscillating at the notch frequency by 180 degrees, but sharply depart from this phase for signals only slightly removed from the notch frequency. Thus, when a twin-T filter is used in the feedback loop of an oscillator, such as is shown in FIG. 2, whose amplifier has already shifted the phase 180 degrees, the filter's additional 180 degree phase shift produces regenerative feedback at the notch frequency while suppressing oscillation at non-notch frequencies.

In the design and adjustment of a twin-T notch filter for use in an oscillator to produce a signalling tone for telephone switching, several different filter characteristics must be considered. One is the frequency at which a notch, and hence oscillation, occurs. This frequency may be increased or decreased by a certain factor by increasing or decreasing the value of each of the resistors in the filter. A second adjustment consideration of the filter is the "notch depth" or the maximum attenuation of the filter at the point of 180 degree phase shift. In an oscillator, such as shown in FIG. 2, a typical value of gain for the amplifier 22 is +35 db. Therefore, if the attenuation of the filter is −35 db, or greater, no oscillation will occur because no signal will be fed back. Conversely, if attenuation of the filter is not great enough, the level of the feedback signal will be too high and distortion of the amplifier output will result. A further overlying consideration for determining the value of attenuation of the filter, is that the final output signal must be a certain level within a certain tolerance, typically 0.70 volt. It has been determined that a "notch depth" value of −30.4±0.5 db satisfies all the requirements of the oscillator. The notch depth may be increased or decreased by varying the ratio of the input and shunt resistors (FIG. 3) R1 and R2 or R8 and R9.

Figure 5:
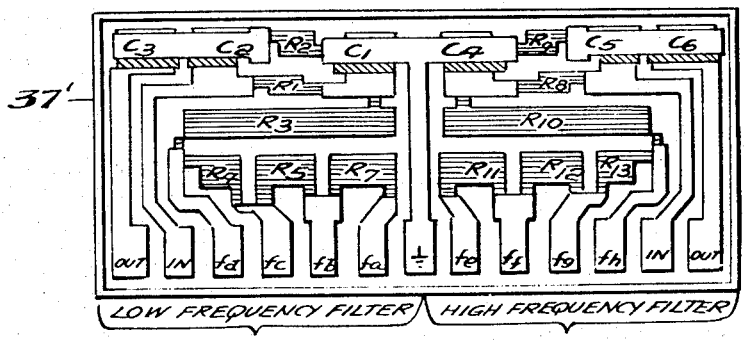
FIG. 5 is a perspective view of the notch filter of FIG. 3 constructed using thin-film technology.

Referring to FIG. 5, the physical make-up of the filters consists of a glass substrate 37 having twelve thin-film resistors R1–R6 and R8–R13 and six thin-film capacitors C1–C6 deposited thereon. The heavy black lines represent resistors, the crosshatched areas indicate tantalum anodized to form a capacitor dielectric, and the white regions are capacitor counterelectrodes and conductors. Although the resistors and capacitors of the filters may be formed on the same substrates which carry the active elements of the amplifiers, they have been shown separately for purposes of simplification. Tantalum technology was chosen to form the components of the filters for principally two reasons. First, the high precision required of the filters could be attained only through the adjustment of tantalum resistors, by anodizing to decrease the volume of conductive metal and hence, increase the resistance. Second, because of the large area required for the capacitors, they could be made more economically using tantalum methods.

As was pointed out above, the characteristics of a twin-T filter may be varied by changing the values of the resistors which make up the circuit. The filter network is made with each of the resistors having nominal values and the performance of the filters is measured and the resistors are adjusted to bring the characteristics to the desired values. The "notch depth," or point of maximum attenuation, may be increased or decreased because the value depends upon the ratio of the input resistor R1 or R8 to the shunt resistor R2 or R9, and either one of these two resistors may be increased to change their ratio. However, the "notch frequency," or frequency at which 180 degree phase shift occurs may only be decreased because the value of the tantalum film resistors may only be increased, by anodizing to convert conductive material to an insulating oxide. Increasing the value of each of the resistors by a certain factor decreases the notch frequency of the filter by the same factor.

The filters are first adjusted to the desired notch depth and then to the proper notch frequency. These adjustments are calculated from equations which are based upon an analysis of the complex transfer function of the notch filters by W. H. Orr, which was discussed in "The Computer Design and Precision Tuning of Thin-Film Filters," Seminar on Integrated Circuits, New York Chapter, Institute of Electrical and Electronic Engineers, Basic Sciences Division, Feb. 2, 1966, pp. 45–56. In the analysis, it was assumed that in the vicinity of the "notch," the value of the transfer function remained constant. Each resistor in the notch filter was individually varied from its value at the notch frequency, and the change in frequency for each resistance change was calculated from the transfer function. The results of the calculations were a series of curves of $\Delta f$ plotted against $\Delta R$ for each resistor. Both network constants and resistance equations were determined from the curves.

Using the low frequency filter of FIG. 3 as an example, the adjustment procedure which is followed for each of the filters is that the initial notch depth is measured at a center frequency. This may be accomplished with the switch 29 closed to place the resistors R3 and R4 in series with the input resistor R1 to produce a filter characteristic such as shown by curve $f_c$ of FIG. 4. The measured value of attenuation may be either above or below the design value of 30.4 db. The correct value of notch depth is set by adjusting either resistor R1 or R2 in accordance with the following formulae:

(1) $$R_n = R_{1,2}(1+|a|)$$

and (2) $$a = \frac{30.4 - X}{22.0}$$

where:

$R_n$ is the value to which R1 or R2 must be adjusted,
$R_{1,2}$ is R1 if $a$ is negative, i.e., the notch depth attenuation is not large enough,
$R_{1,2}$ is R2 if $a$ is positive, i.e., the notch depth attenuation is too large,
$a$ is the notch depth adjustment factor,
$1+|a|$ is the notch depth correction factor, and
22.0 is a network constant derived from the circuit analysis mentioned above.

The proper resistor, either R1 or R2 as determined above, is anodized, as will be described in greater detail below, to increase its value to $R_n$ and the notch depth of the filter is changed to 30.4 db±0.5 db. When the filter is placed in a circuit with an amplifier (as shown in FIG. 2), oscillation will occur and a tone will be produced; however, the frequency of oscillation will be too high for each design value, $f_a$, $f_b$, $f_c$ and $f_d$. As was pointed out above, these higher than design frequencies are intended results to accommodate the trim anodizing process, which can adjust resistors upward only and thereby results in a decrease in frequency.

Each of the eight frequencies of oscillation and all of the notch filter resistors are measured. Using these values, frequency adjustment factors are calculated to adjust the filter to the proper design frequencies $f_a$, $f_b$, $f_c$, $f_d$, $f_e$, $f_f$, $f_g$ and $f_h$. Again using the low frequency filter of FIG. 3 as an example, the highest measured frequency $f_1$ of the untuned oscillator, as determined by R3, is compared to its design value $f_d$ to establish a frequency adjustment factor $b_1$ as:

(3) $$b_1 = \frac{f_1}{941}$$

To maintain the notch depth at its design value of 30.4 db, both R1 and R2 must be readjusted by the frequency adjustment factor $b_1$, so that their ratio remains constant.

Frequency adjustment factors $b_2$, $b_3$ and $b_4$ for the remaining three lower frequencies $f_c$, $f_b$ and $f_a$ of the low frequency filter are determined according to the following relationships:

(4) $$b_2 = \frac{2.302 f_2}{852} - 1.302 b_1$$

(5) $$b_3 = \frac{2.302 f_3}{770} - 1.302 b_1$$

(6) $$b_4 = \frac{2.302 f_4}{697} - 1.302 b_1$$

where $f_2$, $f_3$ and $f_4$ are the untuned oscillator frequencies, and 2.302 and 1.302 are network constants.

Using the frequency adjustment factors $b_1$, $b_2$, $b_3$ and $b_4$, the final resistance values $R3_f$, $R4_f$, $R5_f$ and $R6_f$ obtained from the unadjusted resistors R3, R4, R5 and R6, respectively, are determined as follows:

(7) $$R3_f = b_1 R3$$

(8) $$R4_f = b_2(R3 + R4) - R3_f$$

(9) $$R5_f = b_3(R3 + R4 + R5) - (R3_f + R4_f)$$

and

(10) $$R6_f = b_4(R3 + R4 + R5 + R6) - (R3_f + R4_f + R5_f)$$

Similar relationships will apply for the high frequency filter of FIG. 3.

GENERAL DESCRIPTION OF METHOD AND APPARATUS FOR MEASURING AND ADJUSTING FILTERS

Figure 6:
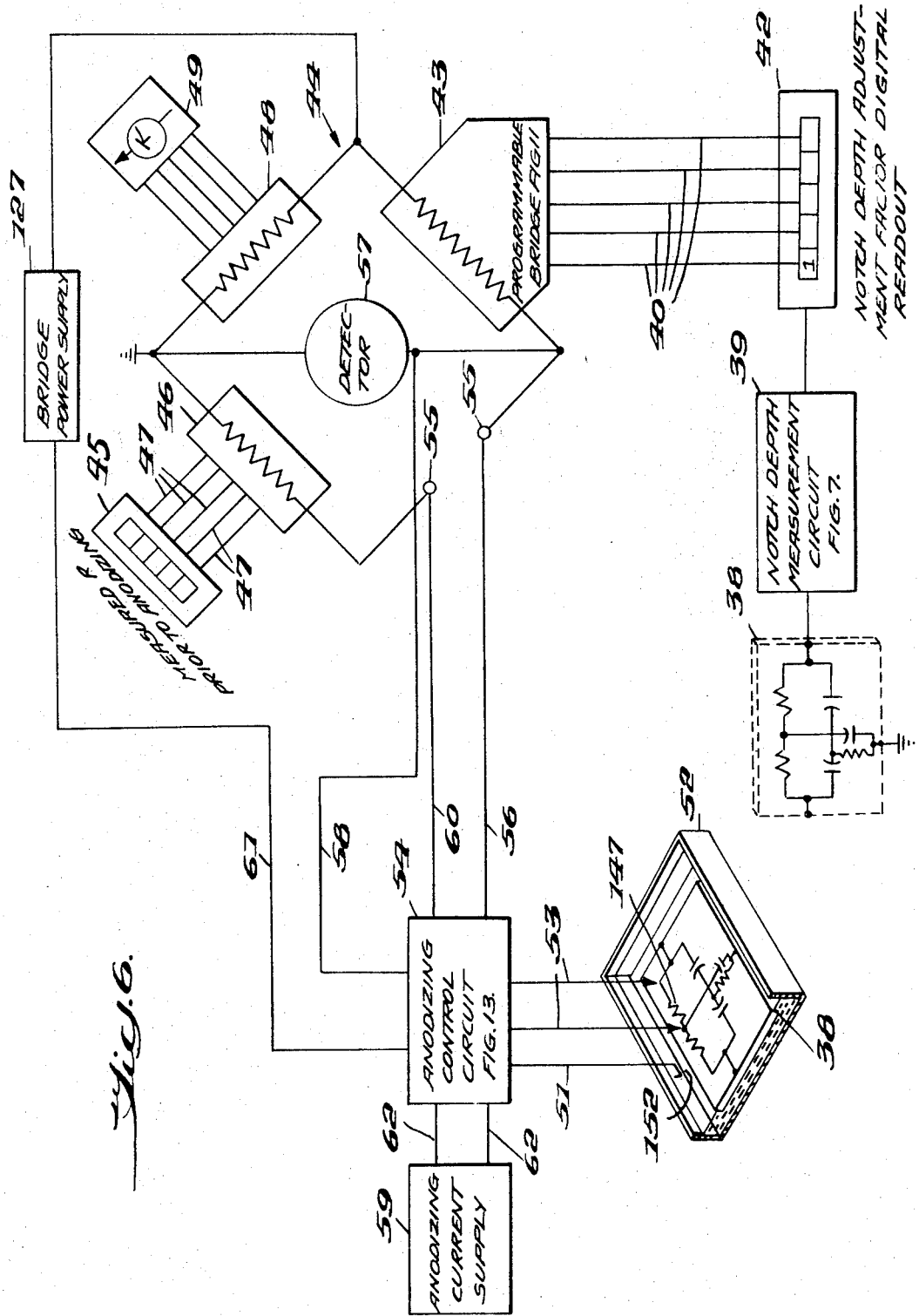
FIG. 6 is, essentially, a block diagram of a circuit for adjusting the notch depth of a notch filter in accordance with the invention.

Referring to FIG. 6, and using the low frequency filter as an example, the general technique used in measuring and adjusting the notch depth of the filters is as follows. The filter 38 is first placed in a circuit 39 for determining the actual notch depth in decibels, as well as, the notch depth correction factor in accordance with Formula 2 above. The notch depth correction factor (1 plus absolute value of notch depth adjustment factor) is indicated on a digital voltmeter 42, which is connected to one arm 43 of a programmable Wheatstone bridge 44 by means of a plurality of cables 40—40. The first (most significant) of the five digits on the voltmeter 42 is strapped to always display a one, since the notch depth adjustment factor is always less than one and the notch depth correction factor is always greater than one. The arm 43 of the bridge 44 is automatically set to a value of resistance equal to the digits displayed on the digital voltmeter 42 by means of a control voltage comprising a permutation of elemental voltages on the wires within the cables 40—40.

Following notch depth measurement, the filter circuit 38 is removed and the resistor to be adjusted, either R1 or R2 depending upon whether or not the notch depth adjustment factor was positive or negative, is measured by a digital ohmmeter 45. The digital display of the ohmmeter 45 is used to set the arm 46 of the programmable bridge 44 that is opposite to the arm 43 which contains the notch depth correction factor. The ohmmeter 45 is connected to the adjustable resistance arm 46 through a plurality of cables 47—47. The third programmable arm 48 of the bridge 44 is manually set to 10,000 by means of a control circuit 49.

With each of the programmable arms 43, 46, 48 of the bridge 44 set, the filter circuit is placed in a tank of anodizing solution 52. A pair of probes 53—53 and a cathode electrode lead 51 from an anodizing control circuit 54 are brought into contact with the filter circuit across the resistor R1 or R2, whose value was recorded in the second arm 46 of the programmable bridge 44. The anodizing control circuit 54 is connected to two terminals 55—55 of the measuring arm of the bridge 44 by means of a pair of wires 56, 60; to the detector 57 of the bridge 44 by means of a lead 58; to a bridge power supply 127 by a lead 61; and to an anodizing current supply 59 by means of a pair of wires 62—62.

As can be seen from the connection of the bridge 44 of FIG. 6, the detector 57 will only indicate a balance when the resistance across the measuring arm terminals 55—55 is equal to the value of the resistance arm 46 multiplied by the correction factor of arm 43. That is, when the value across the measuring arm is equal to the corrected value of resistance, $R_n$ of Formula 1, the bridge 44 will be balanced. The anodizer control circuit 54 constantly monitors the detector 57 while alternately anodizing the resistor of the notch filter 38 and connecting the anodized resistor to the measuring arm terminals 55—55 of the bridge 44. When the detector 57 indicates balance, the anodizer control circuit 54 stops and the resistor is equal to the corrected value. The notch filter 38 now has a notch depth of 30.4 db±0.5 db and is ready for frequency adjustment.

NOTCH DEPTH MEASUREMENT

Figure 7:
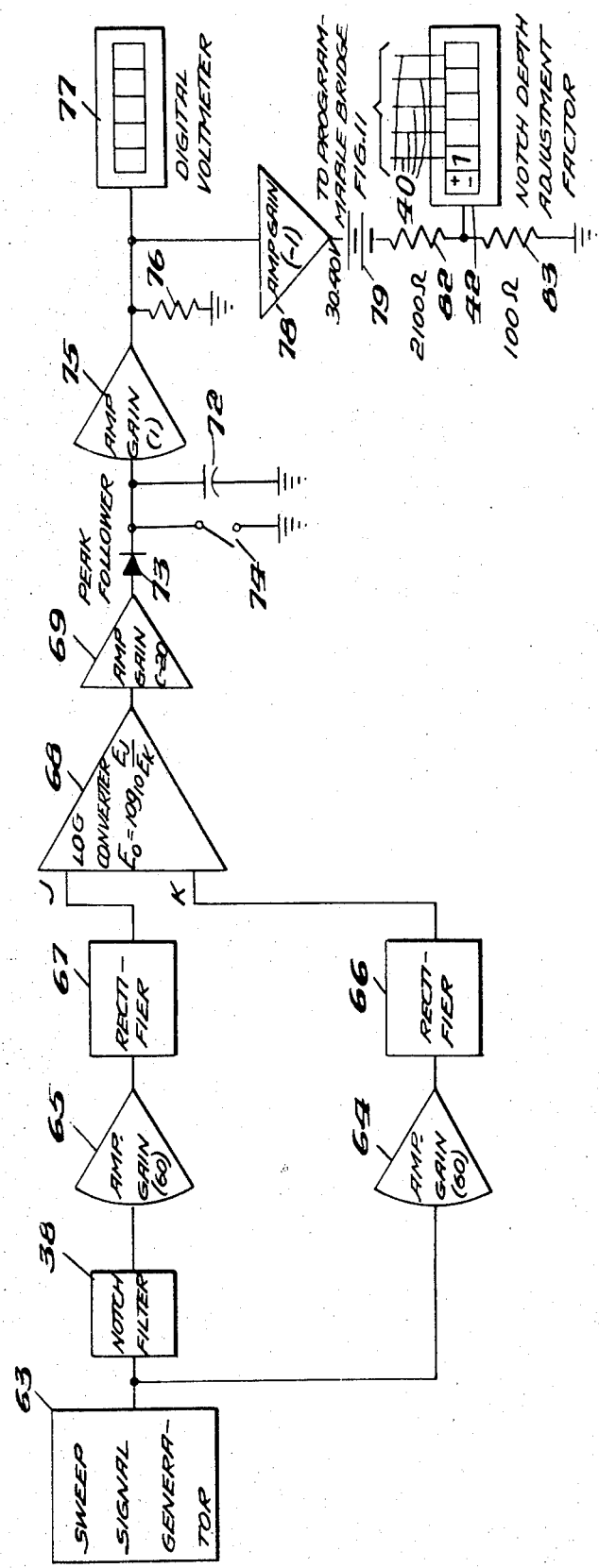
FIG. 7 is a block diagram of a circuit for measuring the notch depth of a notch filter in accordance with the invention.

The notch depth and the adjustment factor for an untuned filter 38 is obtained using the circuit of FIG. 7. A sweep generator 63 produces a signal which periodically varies in frequency through the entire range of frequencies to which the filter 38 is sensitive, for example, from 40 to 4000 Hz. The signal from the sweep generator 63 is connected to the input of the filter 38 and also to the input of an amplifier 64. The output of the filter 38 is likewise connected to an amplifier 65. The amplifiers are necessary because of the relatively low operating voltage level of the filter 38; the output of the sweep generator is preferably in the range of 50 mv. R.M.S. A pair of amplifiers 64 and 65 having a voltage gain of approximately 60 were used, but this figure is not critical. What is important, however, is that the gains of both amplifiers 64 and 65 be as nearly identical as possible so that the ratio of the input signal of the filter 38 to the output signal remains the same after each is amplified.

The output of the amplifiers 64 and 65 are connected to rectifiers 66 and 67, respectively. Again, it is important that the characteristics of the two rectifiers 66 and 67 be identical so that their respective DC output voltages K and J have the same ratio as the input and output voltages of the filter 38. The outputs of each of the rectifiers 66 and 67 are connected to an input, K and J, respectively, of a log ratio converter 68. The converter 68 has the characteristic that it produces a positive output signal which is equal to the logarithm to the base 10 of the ratio of the voltage at input terminal J to the voltage at input terminal K. Log ratio converters are commercially available. One may be used which is similar to the analog function modules manufactured by the Burr-Brown Research Corp., of Tucson, Ariz. The output of the log converter 68 is connected to an amplifier 69 which has a gain of −20. The gain of 20 is necessary to satisfy the formula for attenuation $$db = 20 \log_{10} \frac{V \text{ out}}{V \text{ in}}$$

and the polarity inversion, the minus factor, is necessary to invert the "notch" characteristic of the filter 38. Following polarity inversion at the output of the amplifier 69, instead of a large negative voltage at the notch frequency, there is a large positive voltage which may be conveniently stored on a capacitor 72. A diode 73 is connected between the output of the amplifier 67 and the capacitor 72 to only allow current flow to charge the capacitor when the voltage from the amplifier 69 is more positive than the voltage stored on the capacitor 72. A grounding switch 74 is provided to discharge the capacitor following the measurement of a particular filter.

The storage capacitor 72 is connected to an amplifier 75 whose output is connected across a high resistance output resistor 76. The amplifier 75 has unity gain and a very high input impedance, and is interposed as a buffer amplifier to prevent discharge of the storage capacitor 72 by the remainder of the circuitry.

In operation, as the sweep generator 63 produces signals which pass through the "notch frequency" of the filter 38, the log ratio converter 68 produces an output signal which is equal to the logarithm to the base 10 of the ratio of the output voltage of the filter to the input voltage of the filter. The output of this log converter 68 will be a DC voltage which varies from zero to a negative voltage (db reading is negative for attenuation) as the frequency of the sweep generator 63 passes through the "notch frequency" of the filter 38. The negative output of the log converter 68 is amplified and inverted by the amplifier 69 and applied to the diode 73, so that the charge stored on the capacitor 72 represents the peak voltage resulting from a plurality of passes of the sweep generator 63 through the notch frequency of the filter 38. The stored voltage is applied to a digital voltmeter 77 through an isolation amplifier 75 and an output resistor 76. The digital voltage reading on the meter 77 is equal to the maximum attenuation (or notch depth) of the filter 38.

In order to convert the notch depth of a filter in decibels to the "notch depth adjustment factor," it is necessary to perform the operation set forth in Equation (2), discussed above. A small "analog computer" is provided to make the conversion. The "computer" comprises an amplifier 78 which has unity gain and only inverts the polarity of the signal to make the "notch depth voltage" a negative voltage. The output of the amplifier 78 is connected in series with a DC voltage source which produces a positive 30.4 volts. The combined voltages are applied to a 2100Ω resistor 82 connected in series with a 100Ω resistor 83 and an output voltage is produced between the two resistors which is equal to 1/22.0 of the total voltage applied across the resistors. The voltage produced between the two resistors 82 and 83 of the voltage divider is displayed on a digital voltmeter 42. The decimal point of the digital voltmeter 42 is set so that the voltage displayed thereon, which may be positive or negative, but is always less than 1, is shown as four significant figures to the right of the left-most digit position. The left-most digit position of the voltmeter 42 is arranged to always indicate a one. This is because the voltage being read across the voltage divider resistor 82 and 83 is equal to the notch depth adjustment factor $a$ of Equation 2 above, and it is necessary to always display on the meter 42 a number equal to the notch depth correction factor which is $1+|a|$, as described above.

BCD CODE

Figure 8:
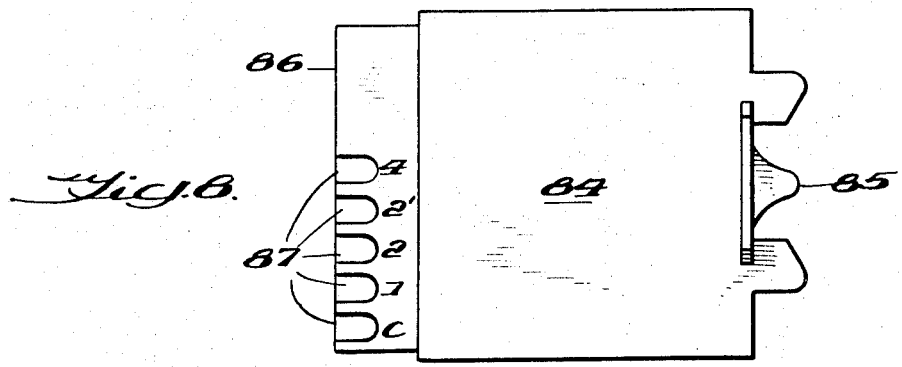
FIG. 8 is a side view of a manual switch capable of indicating a decimal digit in a binary coded decimal system.
Figure 9:
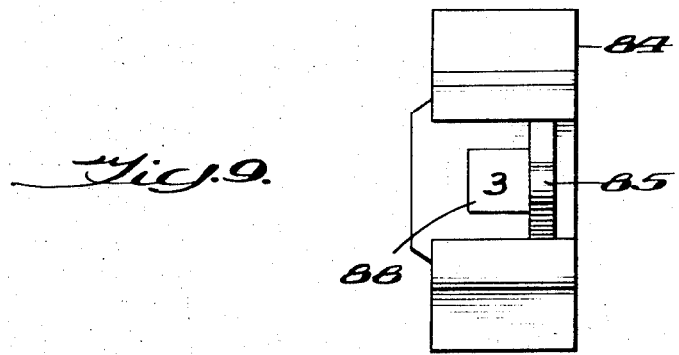
FIG. 9 is a front view of the switch shown in FIG. 8.
Figure 10:
FIG. 10 is a chart illustrating the operation of the switch shown in FIGS. 8 and 9.

The means of intercommunication which is used between each of the digital components of the system disclosed is that of the "Berkeley" or 1–2–2′–4 binary-to-decimal code. Referring to FIGS. 8–10, the code may be explained in terms of a manual switch such as the type 313 sold by the Digitran Company of Pasadena, Calif. The switch comprises a body portion 84 within which a selector wheel 85 is rotatively mounted. A terminal strip having five terminals 87—87 is mounted upon the rear of the switch. The terminals 87—87 are designated 4, 2′, 2, 1, and C, respectively. In operation, the selector wheel is rotated until the desired digit is indicated in a display window 88. The switch connects the terminals 87—87 together, depending upon which digit is selected, in accordance with the chart shown in FIG. 10. For example, to indicate the digit 3, the switch connects the 1 terminal and the 2 terminal to the $c$ terminal. Thus, it may be seen that by using five conductors, or four conductors and a common ground for all systems, any digit from 0 through 9 can be indicated as a control signal having a permutative arrangement of elemental voltages. By sensing 1 or 0, that is, "connection" or "no connection," for each of the four conductors, information may be transmitted for each digit position of a digital meter. The Berkeley Code is employed in each of the digital meters used in the system disclosed. The model 5603H3 digital volt-ohm-ratio meter sold by Dana Laboratories, Inc., of Irvine, Calif., produces elemental voltages of zero volts to indicate a 0 and a positive twelve volts to indicate a 1 on each of the four terminals for each digit position of the display.

Referring again to FIG. 7, the digital voltmeter 42, upon which the notch depth correction factor is displayed is connected to the first adjustable arm 43 (FIG. 6) of the programmable bridge 44 by means of five cables 40—40. Each component of the system disclosed is connected to a common ground and each cable 40—40 consists of four separate conductors which all together are capable of communicating information for five digit positions as a control signal having a plurality of elemental voltages arranged in accordance with the Berkeley code described above.

RESISTIVE ARM OF PROGRAMMABLE BRIDGE

Figure 11:
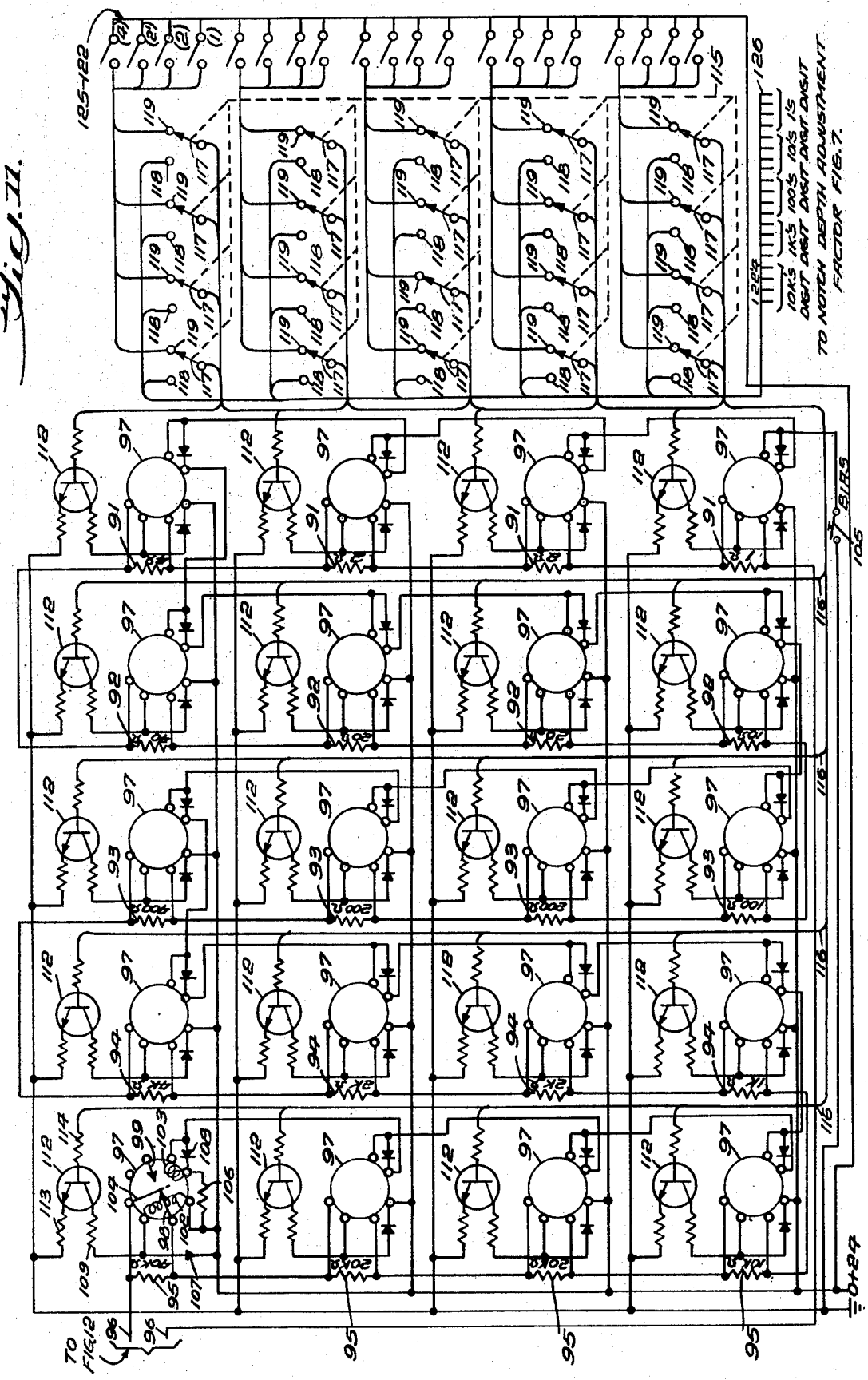
FIG. 11 is a schematic diagram of one adjustable arm of a programmable Wheatstone bridge constructed in accordance with the invention.

FIG. 11 shows the details of the first adjustable arm 43 (FIG. 6) of the programmable bridge 44. The arm comprises twenty resistors 91–95 which are connected in series between a pair of output terminals 96—96 and arranged in five columns or groups and four rows. Each resistor is normally shorted out and selected ones of the resistors may be placed in series combination. The first column of resistors 91—91 corresponds to a units digit of the series combination, the second column 92—92 to a tens digit of the combination, the third column 93—93 to a hundreds digit, the fourth column 94—94 to a thousands digit, and the fifth column 95—95 to a ten thousands digit. The four resistors in each group are arranged in a 1-2-2'-4 combination so that the resistors in each row correspond to a different tens multiple of the same digit. By selectively shorting out different ones of the resistors, any value of resistance between 0 and 99,999 ohms, in steps of one ohm each, may be connected between the output terminals 96—96.

Each of the twenty resistors is connected across a pair of contacts of a relay 97. Although a number of different types of relays could be used in the circuit, it is preferable to use a latching relay having mercury wetted contacts similar to the type 303J relay made by the Western Electric Company, Inc. Each of the relays 97—97 is identical and is connected to its associated resistor as shown and discussed in detail in connection with the 40K ohm resistor in the upper left-hand corner of FIG. 11. The relay 97 has a pair of stationary contacts 98, 99; a pair of relay coils 102, 103 associated with the fixed contacts 98 and 99 respectively; and a movable contact 104 which completes a circuit with one of the fixed contacts 98 or 99 in response to energization of the corresponding opposed relay coil 102 or 103. Normally the relay 97 will function as a locking relay and the movable contact 104 will remain connected to the fixed contact 98 until the relay is actuated by energizing the associated relay coil 102. That is, for the chosen direction of current flow through the relay coils 102, 103, the movable contact 104 is repelled away from the relay coil which is energized. In the arrangement as shown in FIG. 11, all of the release coils 103—103 are serially connected from ground through a bias switch 105 and a current-limiting resistor 106 to a positive 24-volt power supply. Diodes 107 and 108 are connected across relay coils 102 and 103, respectively, to inhibit current flow due to an inductive effect.

The resistor associated with each relay 97 is connected between the fixed contact 98 and the movable contact 104 so that when the relay coil 102 associated with the fixed contact 98 is not energized, the resistor is shorted out and removed from the series combination between the output terminals 96—96. No external connection is made to the opposite fixed contact 99 so that when the relay coil 102 is energized, the movable contact 104 engages the fixed contact 99 to unshort the resistor and place it in the series combination. One side of the energizing coil 102 is connected to a positive 24-volt power supply while the opposite side is connected to a collector resistor 109 of a normally non-conductive transistor 112. The emitter of the transistor 112 is connected to ground through an emitter resistor 113. When emitter-collector path of the transistor 112 is conductive, current flows from the power supply through the relay energizing coil 102 to actuate the relay by repelling the movable contact 104 into connection with the fixed contact 99. In an arrangement of the circuit, each of the actuated relays 97 remains "set" with its associated resistor unshorted by the movable contact 104, until all of the relays are "reset" by closing the bias switch 105 to energize all of the "reset coils" 103—103 of the relays 97—97 which repel the movable contacts 104—104 to the shorting contacts 98—98. In this arrangement, a series resistor combination remains "set" between the output terminals 96—96 without keeping the relay coils 102—102 and the associated transistor 112—112 continuously energized. In a different arrangement of the circuit, the bias switch 105 is closed continuously and the relay contacts 98—98 and 104—104 only remain open as long as the "set" relay coils 102—102, and hence the transistors 112—112, are energized.

Each transistor 112 has a base resistor 114 which is connected to a multi-position, multi-gang selector switch 115 through a system of cables 116—116. The switch 115 comprises 20 individual switch elements, each of which has a movable contact 117, a first fixed contact 118, and a second fixed contact 119. The switch elements are arranged in four rows and five columns to correspond to the four columns and five rows of resistor and relay circuits discussed above. The top horizontal row of switch elements is associated with the right-most column of resistors 91—91 and relays. The base resistor 114 of each transistor 112 is connected to one movable contact 117 of a switch element of the switch 115. For example, through the system of cables 116—116, the movable contact 117 of the left-most switch element of the top horizontal row of switch elements is connected to the base resistor 114 of the bottom transistor 112 of the right-most column or resistor 91—91 and relays.

Each of the movable contacts 117—117 of the switch elements are ganged together so that all move at once to connect with either the first contacts 118—118 or the second contacts 119—119. When the movable contacts 117—117 are connected to the second contacts 119—119, the base resistors 114—114 of the respective transistors 112—112 are connected to a series of manually operated selectors 122—122 to 125—125. The selectors are preferably similar to the switch shown and discussed in connection with FIGS. 8–10. Each of the selectors numbered 122 (1 of the Berkeley code) is associated with the left-most vertical column of switch elements and thereby the bottom row of resistors and relay circuits. Likewise, the selectors numbered 125 (4 of the Berkeley code) are associated with the right-most column of switch elements and hence the top row of resistors and relay circuits. By normally closing selected ones of the selectors 122-125, the corresponding selected ones of the transistors 112—112 are energized by connection to a positive 24-volt power supply to unshunt its associated resistor and thereby place it in the series combination. When the movable contacts 117—117 are connected to the second fixed contact, any resistance between 0 and 99,999 ohms may be placed between the output terminals 96—96 by manually setting the selectors 122-125. Generally, when in the manual mode, the circuits are operated with the bias switch 105 closed so that the various resistors may be reset by simply changing the selector settings.

When the movable contacts 117—117 are connected to the first contacts 118—118 of the switch elements, the base resistors 114—114 of the respective transistors 112—112 are connected to a remote jack terminal 126. At the terminal 126, each of the base resistor connections appear grouped by vertical columns of relay and resistor circuits (10,000s digit, 1,000s digit, 100s digit, 10s digit, and 1s digit), and sub-grouped by horizontal rows of relay and resistor circuits (1, 2, 2', and 4 of the Berkeley code). The connections of the terminal 126 go to the corresponding four wires within each of the five cables 45—45 of FIG. 7. A single common ground connection (not shown) is also made so that any digit which is shown on the face of the digital voltmeter 42 is automatically set as a resistance into the adjustable arm of the programmable bridge of FIG. 11 by energizing selected ones of the transistors 112—112 through the connection of the jack terminal 126. Generally, when in the remote mode, the circuits are operated with the bias switch 105 open so that the various resistors which are set will remain after the energizing voltage has been removed from the conductors of terminal 126.

Referring again to FIG. 6, the two other adjustable arms 48 and 46 of the programmable bridge 44 operate identically to the adjustable arm 43 described in connection with FIG. 11. Selectors 122-125 are used to manually set the adjustable arm 48 (FIG. 6) to 10,000 ohms. The selectors are illustrated separately by numeral 49. The adjustable arm 46 is set by the digital ohmmeter 45, through the cables 47—47, just as the arm 43 was set by the digital voltmeter 42, as described in connection with FIG. 11.

Figure 12:
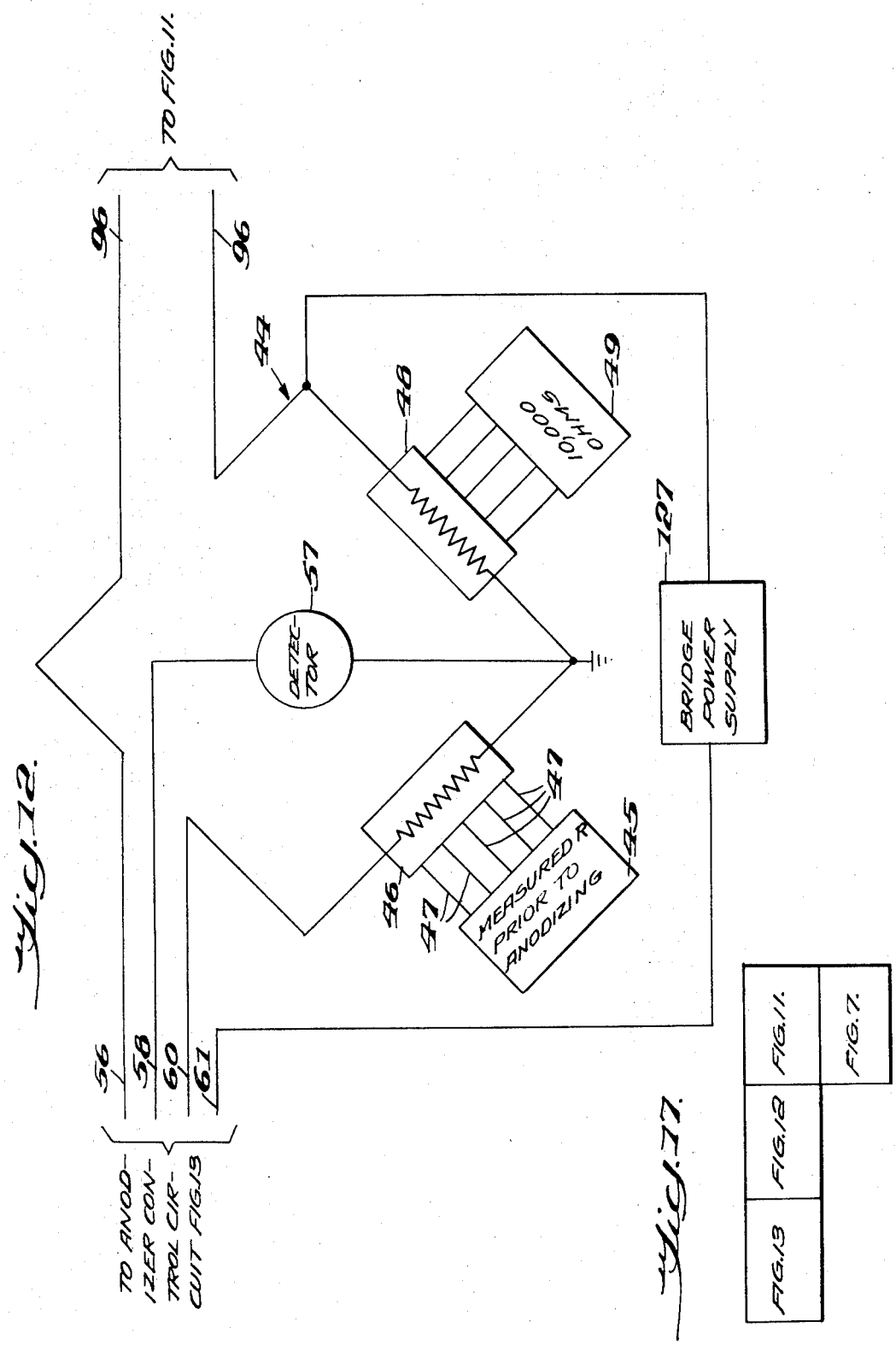
FIG. 12 is a block diagram of a programmable bridge constructed and connected in accordance with the invention.

Referring to FIG. 12, the output terminals 96—96 of the adjustable arm 43 (FIG. 6), shown in detail in FIG.

11, which is set to the notch depth correction factor, is connected to one side of the bridge 44. One terminal of a DC voltage supply 127 is connected between the arms 48 and 49 of the bridge. The other terminal 61 of the voltage supply 127 is connected to the anodizing control circuit of FIG. 13. The measuring arm connections 56 and 60 and detector circuit connections 58 of the bridge 44 are connected to the anodizing control circuit shown in FIG. 13. One side of the detector 57 is connected to ground potential and the polarity of the power supply 127 is connected so that the detector produces a negative output on lead 58. The bridge connections are carried out to the anodizer control circuit in leads 56, 58, 60, and 61 so that interconnections may be made there to reduce the effect of lead resistance.

ANODIZING CONTROL CIRCUIT

Figure 13:
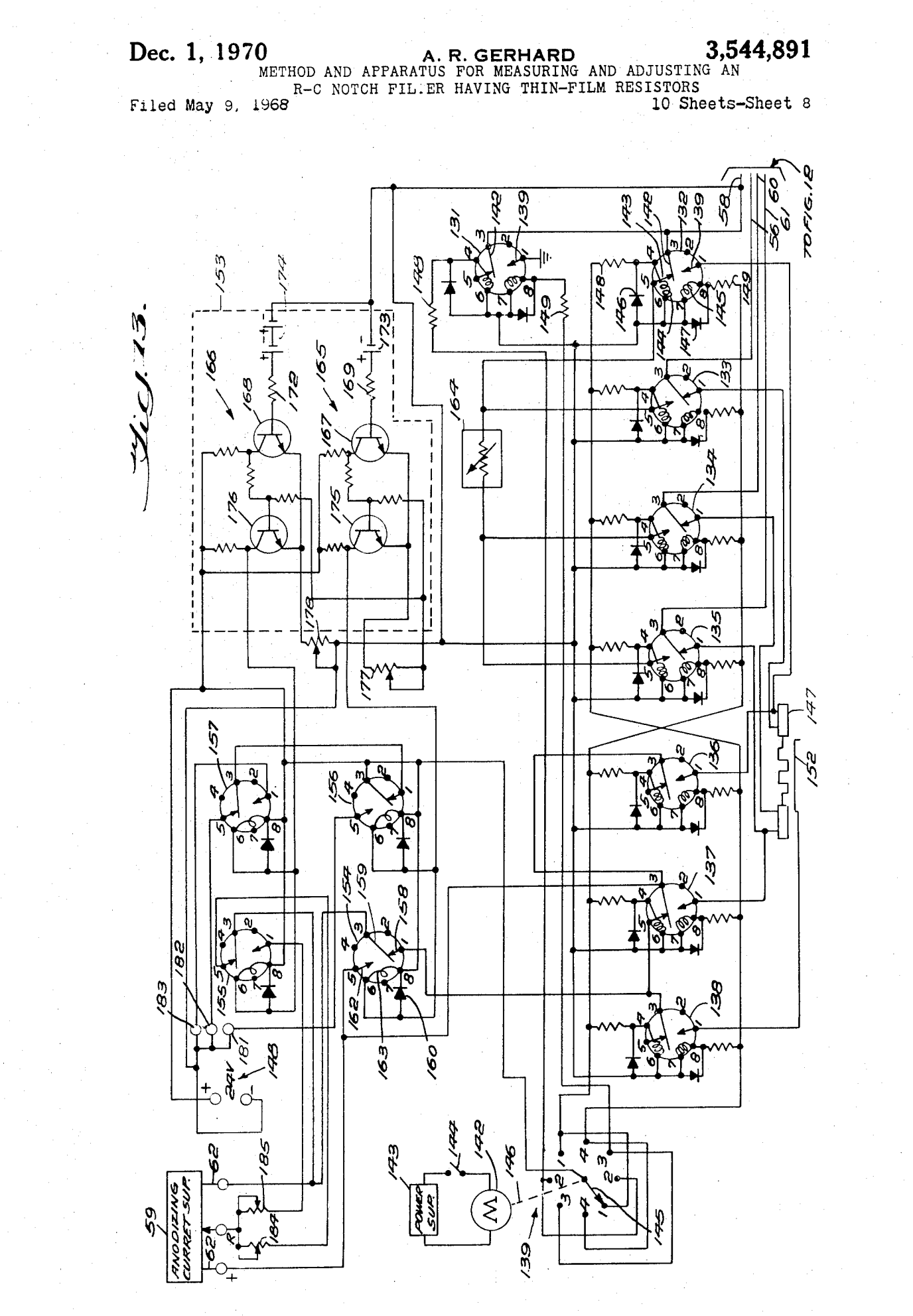

Referring now to FIG. 13, the anodizing control circuit includes eight sequence relays 131–138, operated under control of a sequence commutator 139. The commutator 139 comprises a conventional electric motor 142 energized by a power supply 143 under control of a switch 144. The motor 142 continually rotates a coupling shaft 156 in a counter-clockwise direction, which moves a wiper arm 145 sequentially into contact with eight fixed terminals. The terminals are denoted 1, 2, 3, 4, 1, 2, 3, 4 and correspond to the following functions; 1, wait; 2, measure; 3, wait; 4, anodize; 1 wait; 2, measure; 3, wait; and 4, anodize. That is, when the wiper arm 145 is in a "measure" position, a workpiece resistor 147 is connected to the measuring arm of the Wheatstone bridge 44 (FIG. 12). Likewise, when the wiper arm 145 is in an "anodize" position, the workpiece resistor 147 is connected to an anodizing current. Similarly, the "wait" positions of the sequence are to allow for a period of circuit changeover from one function to the other.

The fixed terminals are connected to operate the eight sequence relays 131–138. Although a number of different types of relays could be used in the circuit, it is preferable to use a latching relay having mercury-wetted contacts similar to the type 303J relay made by the Western Electric Company. Each of the sequence relays 131–138 is identical, having a fist fixed contact 139 connected to terminal 1, a movable contact 142 connected to terminal 3, a second fixed contact 143 connected to terminal 5, and two separate operating windings 144 and 145 connected, respectively, between terminals 4 and 6 and terminals 7 and 8. The windings 144 and 145 of each relay are connected together at terminals 6 and 7 which are conected to the negative terminal of a 24-volt power supply 148. Diodes 146, 147 are connected across the windings 144 and 145, respectively, to inhibit inductive currents and to prevent curent from flowing through both windings at the same time. Current limiting resistors 148 and 149 are connected to the relay windings 144 and 145, respectively. When terminal 8 of each relay is made positive with respect to terminal 7, the relay winding 145 is energized to bring the movable contact 142 into engagement with the first fixed contact 139. Since each of the relays 131–138 is of the latching type, the contacts 142, 139 will remain closed even after the relay windings 145—145 are deenergized. A subsequent application of a positive voltage to terminal 4 will energize the opposite winding 144 and the movable contact 142 will move to the second fixed contact 143.

In operation, sequence relays 132–135 control the connection of the workpiece resistor 147 to the bridge circuit of FIG. 12 for movement while sequence relays 136–138 control the connection of the workpiece resistor 147 to the source of current for anodizing. Referring again to the commutator 139, the motor 142 is selected to rotate the wiper arm 145 at approximately 75 r.p.m. so that it is in contact with each fixed terminal for approximately 100 milliseconds. When the wiper arm 145, which is connected to the positive terminal of the 24-volt power supply 148, is in contact with fixed terminal 1 of the commutator 139, a positive voltage is applied to terminal 4 to close contacts 142 and 143 of relays 136–138 and to terminal 8 to close contacts 142 and 139 of relays 132–135. Since contacts 139—139 of relays 136–138 all stand "open" the anodizer cathode electrode 152, and both ends of the workpiece resistor 147, are disconnected from the anodizer current. The closed contacts 142–139 of relays 135 and 134 connect one end of the workpiece resistor 147 to bridge circuit leads 61 and 60, respectively, while the closed contacts 142–139 of relays 133 and 132 connect the other end of the workpiece resistor 147 to bridge circuit leads 56 and 58, respectively. While each of the relays 132–135 are switched to make the bridge lead connections 56, 58, 60 and 61, the detector output lead 58 was shorted out between contacts 142 and 139 of relay 131 to prevent transient voltages from disturbing the detector reading. The 100 millisecond dwell time of wiper arm 145 on terminal 1 of the commutator 139 is more than sufficient to allow the relays 131–138 time to switch because the mercury type relays will transfer in from 1 to 5 milliseconds.

When the wiper arm 145 moves to contact 2, the relays 132–138 remain as they were previously set due to their latching characteristic as discussed above. Contact 2 does, however, apply a positive voltage through the current-limiting resistor 148 to terminal 4 of relay 131 to open contacts 142 and 139 and remove the ground from the detector lead 58. The bridge 44 (FIG. 12) now "measures" the value of workpiece resistor 147 and the detector 57 generates a positive signal on lead 58 to indicate the degree of deviation from the desired value of resistance. During the 100 millisecond dwell time on contact 2, (FIG. 13), the negative detector output signal, in the range of 500 microvolts, is registered upon the Schmitt trigger circuit 153 of the anodizing rate control circuit which will be discussed more fully below.

When the wiper arm 145 moves to contact 3, the relays 132–138 remain as they were previously set, but a positive voltage is applied through the current-limiting resistor 149 to terminal 8 of relay 131 to close contacts 142 and 139 and again apply a ground to the detector lead 58. It is to be noted that the response time of the detector circuit is chosen to be long enough that the output of the detector, on lead 58, does not decrease appreciably from the range of 500 microvolts during the 100 milliseconds of grounding. The principal purpose of grounding is to prevent the voltage on lead 58 from increasing due to large switching voltage transients. Such an increase would require a correspondingly long delay time to return the detector voltage to normal.

As the wiper arm 145 moves to contact 4 of the commutator 139, a positive voltage is applied to terminal 8 to close contacts 142 and 139 of relays 136–138 and to terminal 4 to close contacts 142 and 143 of relays 132–135. Relay 138 now connects the anodizer cathode electrode 152 to the negative side of an anodizer current supply 59 through the closed contacts 158 and 159 of an on-off relay 154 of the anodizer rate control circuit. Relays 136 and 137 connect both ends of the workpiece resistor 147 to the positive side of the anodizer current supply 59 and current will flow through an electrolyte solution (not shown) to anodize the resistor 147 and thereby increase its resistance. The closed contacts 142–143 of relays 135 and 134 connect one end of a dummy resistor 164 to bridge circuit leads 61 and 60, respectively, while the closed contacts 142–143 of relays 133 and 132 connect the other end of the dummy resistor 164 to bridge circuit leads 56 and 58, respectively. The value of the dummy resistor 164 is variable, and it is set so that it approximates the value of the workpiece resistor 147 to prevent disturbance of the bridge circuit during the anodizing operation.

After the 100 millisecond dwell period, the wiper arm 145 moves from contact 4 to the subsequent contact which terminates the anodization period and begins the entire cycle over again. The 100 milliseconds of anodization is the same for each subsequent cycle, but the anodization rate may vary since the anodizing current may be changed by the anodizing rate control circuit shown in the upper portion of FIG. 13.

The output voltage on the detector lead 58 is connected to a pair of Schmitt triggers 153 during the "measuring" portion of the cycle, when the commutator wiper arm 145 is on contact 2 as discussed above. The negative detector voltage is impressed upon the base electrode of a first transistor 167, through its base resistor 169, and bias voltage source 173. The transistor 167 is connected in a conventional Schmitt trigger configuration with a second transistor 175, through a series of biasing and coupling resistors, to form an "on-off control" Schmitt trigger 165. When the output of the detector circuit is zero, indicating the bridge is balanced, the transistor 167 is conductive due to a positive bias voltage of approximately 1.4 volts which is supplied by the bias source 173. The point of conductivity of transistor 167 may be further regulated by a variable emitter resistor 177. The conduction of transistor 167 holds transistor 175 in a non-conductive state.

The negative detector voltage is also impressed upon the base electrode of a third transistor 168 through its base resistor 172 and bias voltage source 174. The transistor 168 is connected in a conventional Schmitt trigger configuration with a fourth transistor 176 to form a "fast-slow rate control" Schmitt trigger 166. Like the first transistor 167, the third transistor 168 is biased into conduction by its bias source 174 of approximately 2.8 volts. Conduction of the third transistor 168 holds the fourth transistor 176 in a non-conductive state.

The anodizer rate control circuit includes an on-off relay 154, a fast-slow relay 155, and a pair of lamp control relays 156, 157. Although a number of different types of relays could be used in the circuit, it is preferable to use a non-latching relay having mercury wetted contacts similar to the type 303E relay made by the Western Electric Company. Each of those relays 154–157, having a first fixed contact 158 connected to terminal 1, a movable contact 159 connected to terminal 3, a second fixed contact 162 connected to terminal 5, and an operating winding 163 connected between terminals 6 and 8. A diode 160 is connected across the windings 163 to inhibit inductive currents. When the windings 163—163 of the relays 154–157 are unenergized, the movable contacts 159—159 engage the second fixed contacts 162—162. When terminal 8 of each relay is made positive with respect to terminal 7, the relay winding 163 is energized to bring the movable contact 159 into engagement with the first fixed contact 158. Since each of the relays 154–157 is of the non-latching type, the contacts 159–158 will only remain closed as long as current flows through the winding 163.

When the anodizing control circuit is in the "off" condition, contacts 159–162 of the on-off relay 154 are closed to short the output terminals of the anodizing current supply 59. Since the supply 59 normally delivers a constant current in the range of 3 milliamps this current may be easily carried by the contacts 159–162 of the relay 154 and the shorting of the output terminals does not affect the performance of the supply 59. The lamp control relay 156 is likewise unoperated during the "off" condition, and its closed contacts 159–162 form a conductive path to the 24-volt power source 148 to illuminate an "off lamp" 181.

When the voltage on the detector lead 58 becomes slightly negative, the on-off control Schmitt trigger 165 fires and the second transistor 175 becomes conductive. The emitter-collector path of the transistor 175, connects the windings 163—163 of the on-off relay 154 and the lamp control relay 156 to the power supply 148 and the relays 154, 156 operate. Closure of the contacts 159 and 158 of the on-off relay 154 connects the negative side of the anodizing current supply 59 to sequence relay 136 for subsequent intermittent connection to the anodizer cathode electrode 152, as disclosed above. Closure of the contacts 159 and 158 of the lamp control relay 156 interrupts current flow to the "off lamp" 181 and connects a current path to the "slow lamp" 182 through the normally closed contacts 159–162 of the lamp control relay 157.

The anodizing current supply 59 is of a type similar to the model 612A constant current power supply made by the Electronic Measurement Company of Eatontown, N.J., in which the current output may be programmed by placing a resistance between the minus and R terminals. For example, when a 50K ohm slow-rate control resistor 184 is connected through contacts 159 and 162 of relay 155, a slow-rate anodizing current of 100 microamperes is delivered. Similarly, when a 1.56K ohm fast-rate control resistor 185 is connected through contacts 159 and 158 of relay 155, a fast-rate anodizing current of 3 milliamps is delivered. The provision of separate fast and slow anodizing currents allows the workpiece resistor 147 to be anodized to value in a much shorter period of time while still preserving accuracy as the resistor approaches the desired resistance value.

Because the fast-slow rate control Schmitt trigger 166 is unactuated, the operating winding 163 of the fast-slow relay 155 is unenergized and contacts 159 and 162 are closed to connect the slow-rate control resistor 184 between the minus and R terminals of the current supply 59. Anodizing current is delivered at the slow-rate and the "slow lamp" 182 is energized by the lamp control relay 157.

When the voltage on the detector lead 58 becomes more negative, indicating a quarter deviation of the bridge from a balanced condition, the fast-rate Schmitt trigger 166 fires. Although the respective bias voltage sources 173 and 174 are approximately 1.4 volts apart, the respective emitter-resistor 177 and 178 of the two transistors 167 and 168 are adjusted so that the fast-rate Schmitt trigger 166 fires when the detector lead 58 is about 0.8 volt more negative than when the slow-rate Schmitt trigger 166 fired. Upon actuation of the Schmitt trigger 166, the power supply 148 energizes the windings 163—163 of the fast-slow relay 155 and the lamp control relay 157 through the emitter-collector path of the now conductive fourth transistor 176.

Closure of the contacts 159 and 158 of the fast-slow relay 155 connects the fast-rate control resistor 185 between the minus and R terminals of the current supply 59. Closure of the contacts 159 and 158 of the lamp control relay 157 connects current from the 24-volt power supply 148 to the "fast lamp" 183 so that it is lighted while anodizing current is being delivered at the fast rate. It is to be noted that the on-off control Schmitt trigger 165 and its associated circuitry remain actuated during all the time that the fast-slow rate control Schmitt trigger 166 is actuated.

The fast-slow anodizing rate control circuit may be modified slightly to give a substantially linear decrease in anodizing current as the workpiece resistor 147 approaches the desired value. Referring to the linear rate control circuit of FIG. 16, the negative output voltage lead 58 of the detector is connected to a high input impedance, high gain operational amplifier 201 which feeds a unity gain current amplifier 202. The output of the current amplifier 202 is used to vary the illumination of a lamp 203 in a photoresistor 204 which thereby changes its output resistance 205. Although various different photoresistors could be used, a type similar to the Model 3006 "Photomod" made by the Cairex Corp. of New York, N.Y. is preferable.

The output leads, minus and R, of the photoresistor 204 are connected to the minus and R leads of the anodizing current supply 59 of FIG. 13 and the linear rate control circuit replaces the fast-slow rate control Schmitt trigger 166 and the two control relays 155 and 157. The on-off control Schmitt trigger 165 and the relays 154 and 156 remain to control the on-off switching of the circuit and the "off lamp" 181.

In operation, when the voltage on the detector lead 58 is at a large negative value, indicating bridge unbalance, the lamp 203 (FIG. 16) is illuminated at the maximum brightness, approximately 6 volts at 40 milliamps. The lamp illumination causes the output resistor 205 to fall approximately 250 ohms which results in the delivery of a large anodizing current, approximately 20 milliamps, from the current supply 59 (FIG. 13). As the detector voltage decreases, the lamp 203 illumination decreases which causes the output resistor 205 to rise in value in continuous, substantially linear fashion. Although a linear increase in resistance is desired, logarithmic and other functions may be used so long as they result in a steady decrease in anodizing current as the bridge approaches a balanced condition.

When the detector output is nearly zero, the lamp 203 is dark and the output resistance 205 is in the range of 100 megohms. This results in an anodizing current of aproximately 1 microamp, just prior to the deactuation of the Schmitt trigger 165 which terminates the anodization process.

Referring to the fast-slow anodizing rate control circuit in the normal sequence of anodizing operations, the notch filter circuit 38 (FIG. 6) is placed in the tanks of anodizing solution 52, and the probes 53—53 are lowered into contact with the ends of the workpiece resistor 147 to be anodized. The switch 144 (FIG. 13) is closed to start the operation of the sequence relays 131–138. As the sequence circuit passes through its "measure" cycle, a relatively large negative voltage is impressed upon the detector lead 58 since the bridge 44 (FIG. 6) is unbalanced due to the fact that the resistance of the unanodized resistor 147 is considerably smaller than required for proper tuning of the filter 38. The relatively large negative voltage on the detector lead 58 (FIG. 13) fires both the fast-slow rate control and on-off control Schmitt triggers 166, 165 so that the "fast lamp" 183 is lighted and the anodizing current supply 59 delivers current at the fast rate to anodize the workpiece resistor 147 during each "anodize" cycle of the sequence circuit.

As the workpiece resistor 147 is anodized and increased in value, the bridge 44 (FIG. 6) approaches a balanced condition and the voltage on the detector lead 58 (FIG. 13) decreases. When the detector voltage has decreased to a pre-selected value, approximately $-0.8$ volt, the fast-slow rate control Schmitt trigger 166 turns off so that the "slow lamp" 182 is lighted and the anodizing current supply 59 delivers current at the slow rate to anodize the workpiece resistor 147 during each "anodize" cycle of the sequence circuit.

As the workpiece resistor 147 is anodized at the slow rate and further increased in value, the bridge 44 (FIG. 6) reaches a balanced condition when the workpiece resistor 147 is equal to its original measured value prior to anodization, set in arm 46, multiplied by the notch depth adjustment factor, set in arm 43. When the bridge is balanced, the voltage on the detector lead 58 is approximately zero and the on-off control Schmitt trigger 165 turns off. The anodizer current path is interupted and the workpiece resistor 147 cannot be further anodized by the "anodize" cycle of the sequence circuit. The "off lamp" 181 is illuminated to notify the operator that he may open the switch 144 to stop the sequencing circuit, raise the probes 53—53 (FIG. 6), and remove the filter 38 from the tank 52. The characteristic of the twin-T notch filter 38 is now adjusted to the proper notch depth of attenuation, that is, 30.4 db±0.5 db.

It is to be noted that the circuit pattern shown on the substrate 30 in FIG. 6 is purely illustrative and an anodization adjustment must be made for both the high and low frequency filters as shown in FIG. 5.

FREQUENCY ADJUSTMENT

When the notch depth of both the high and low frequency sections of the filter have been adjusted, the notch frequency must be adjusted for each of the eight design frequencies $f_a-f_h$ to be attenuated. Referring to FIG. 14, which shows only one of the two oscillators to be adjusted, the filter 23 is assembled in the feedback loop of the amplifier 22, which is coupled to the buffer amplifier 24 to form an oscillator. The oscillator frequency may be varied, by depressing the selector switches 27–36. The tones produced $f_1-f_8$, each slightly higher in frequency than the final adjusted values design frequencies $f_a-f_h$, which are desired. The oscillator output is fed into one terminal of a digital frequency ratio meter 186 and the output of a frequency synthesizer 187 is connected to the other terminal. The ratio meter 186 serves to indicate the quotient of the oscillator frequency divided by the standard frequency produced by the frequency synthesizer 187. Since the unadjusted oscillator frequencies will always be larger than, but less than twice the standard frequencies, their ratio will be a number between 1 and 2. Although a number of different components might be used, it is preferable to use equipment similar to the model GR1116A frequency synthesizer made by the General Radio Corporation of West Concord, Mass. and the model HP5532A frequency meter made by the Hewlett-Packard Corporation of Palo Alto, Calif.

The frequency synthesizer 187 is set to successively generate each of the design frequencies as: 697 ($f_a$), 770 ($f_b$), 852 ($f_c$), 941 ($f_d$), 1209 ($f_e$), 1336 ($f_f$), 1477 ($f_g$), and 1636 ($f_h$) Hz. As the oscillator 186 is set to each of the actual frequencies $f_1-f_8$, which correspond to the design frequency being generated, a ratio factor $r_1-r_8$ is recorded from the digital meter 186. Frequency adjustment factors $b_1-b_8$ are next calculated for each of the frequencies generated by the oscillator according to the following relationship:

(11) $\qquad b_1=r_4$
(12) $\qquad b_2=2.302r_3-1.302b_1$
(13) $\qquad b_3=2.302r_2-1.302b_1$
(14) $\qquad b_4=2.302r_1-1.302b_1$
(15) $\qquad b_5=r_8$
(16) $\qquad b_6=2.302r_7-1.302b_5$
(17) $\qquad b_7=2.302r_6-1.302b_5$
(18) $\qquad b_8=2.302r_5-1.302b_5$ where $r_1-r_8$ are the ratios of the untuned oscillator frequencies $f_1-f_8$ to the corresponding design frequencies $f_a-f_h$, in order of increasing frequency, and 2.302 and 1.302 are network constants. It is to be noted that Formulas 11–18 are directly related to Formulas 3–6, discussed above.

The value of each of the unadjusted resistors is measured. Using the frequency adjustment factors $b_1-b_8$, the final resistance values $R1_f-R13_f$ obtained from the unadjusted resistance values R1–R13 (FIGS. 3 and 5), respectively, are determined as follows:

(19) $\qquad R1_f=b_1R1$
(20) $\qquad R2_f=b_1R2$
(21) $\qquad R3_f=b_1R3$
(22) $\qquad R4_f=b_2(R3+R4)-R3_f$
(23) $\qquad R5_f=b_3(R3+R4+R5)-(R3_f+R4_f)$
(24) $R6_f=b_4(R3+R4+R5+R6)$
$\qquad\qquad\qquad\qquad -(R3_f+R4_f+R5_f)$
(25) $\qquad R8_f=b_5R8$
(26) $\qquad R9_f=b_5R9$
(27) $\qquad R10_f=b_5R10$
(28) $\qquad R11_f=b_6(R10+R11)-R10_f$
(29) $\qquad R12_f=b_7(R10+R11+R12)-(R10_f+R11_f)$ and

(30) $R13_f=b_8(R10+R11+R12+R13)$
$\qquad\qquad\qquad\qquad -(R10_f+R11_f+R12_f)$ The calculated values of final resistance R1$_f$–R13$_f$ are used in a circuit similar to FIG. 6, which was employed to adjust the notch depth of the filters. Referring to FIG. 15, the programmable bridge 44 is used to control the anodizing control circuit 54, which delivers current to anodize each of the resistors R1–R13 to the proper value to give the design frequency responses $f_a$–$f_h$. Anodization and control is performed exactly as was described above in connection with notch depth.

The terminals 55—55 of the measuring arm of the programmable bridge 44 are connected to the anodization control circuit 55. The adjustable arm 43 of the bridge 44 is set to the final value of resistance, as calculated above, by means of its manual selector 49. The other two adjustable arms 46 and 48 are set to a constant value of 10,000 ohms by means of manual selectors 188 and 189, respectively. Once the cycles of anodizing and measuring are begun, as discussed above, they will continue until the workpiece resistor 147 increases to equal the desired value set into adjustment arm 43. The anodization process is repeated for each of the twelve resistors in the two notch filters. When all resistors have been anodized for frequency adjustment, the two oscillator circuits are given a final test to insure that the frequencies are within ±0.2% of the design values and that the output voltages of the buffer amplifiers are within 1 db of the design output voltage levels.

It is to be understood that the above-described embodiments are simply illustrative of the invention and that many other embodiments can be devised without departing from the scope and spirit of the invention.

What is claimed is:

1. In a circuit for controlling the rate at which a thin resistor is anodized to increase its resistance to a predetermined value:

bridge means, including a detector and a measuring arm, for producing an output voltage to indicate the extent which a resistance connected across said measuring arm differs from said predetermined value;

first means for connecting the thin film resistor across the measuring arm of said bridge;

means for supplying a variable anodizing current comprising, in combination, a variable resistor in the path of the anodizing current for adjusting the current magnitude, and means for increasing the value of said variable resistor in a linear manner in response to a decrease in the output voltage from the detector of said bridge so that the anodizing current magnitude is decreased in proportion to an increase in the value of said variable resistor;

second means for connecting the thin film resistor to said anodizing current supply means; and means for operating said first and second connecting means alternately.

2. Apparatus for measuring notch depth attenuation in a notch filter comprising:

means for supplying an alternating signal to the input of said filter and sweeping the frequency of the alternating signal cyclically through an operating range characteristic of said filter;

first means for amplifying the output signal from said filter by a first predetermined value and rectifying the amplified filter output signal to produce a first intermediate signal;

second means for amplifying the alternating signal by the first predetermined value and rectifying the amplified alternating signal to produce a second intermediate signal;

converter means for generating a signal equal to the logarithm to the base 10 of the ratio of the first intermediate signal to the second intermediate signal;

third means for amplifying the output of said converter means by a factor of minus 20;

a capacitor connected across the output of said third amplifier means for storing the maximum value of signal present the output of said third amplifier means; and means for displaying the voltage across said capacitor as an indication of the notch depth of said filter in decibels.

3. Apparatus for adjusting to a predetermined value the notch depth attenuation of a notch filter which includes a pair of attenuation adjusting resistors, which comprises:

means for generating a first signal voltage, the value of which corresponds to the attenuation of the filter in decibels at the notch frequency;

means responsive to the generation of said first voltage for subtracting said first voltage signal from a predetermined voltage to produce a second voltage signal, said predetermined voltage being equal to said predetermined value of attenuation in decibels;

resistive means rendered effective upon production of said second voltage for dividing said second voltage by a predetermined factor to obtain a third voltage the magnitude of which corresponds to an adjustment factor by which the value of an attenuation adjusting resistor in said filter must be increased to obtain said predetermined value of attenuation;

a programmable Wheatstone bridge having three adjustable arms, first means for connecting an external resistor to a fourth arm, and detector means for generating an output signal the value of which is proportional to degree of imbalance in said bridge;

second means for connecting the attenuation adjusting resistor of said filter to be increased in value to the fourth arm of said bridge;

means for setting a first resistive arm of said bridge, opposite the fourth arm, to 10,000 ohms;

means for setting a second resistive arm of said bridge, between the first and fourth arms, to the measured value of the attenuation adjusting resistor;

a series of resistors;

third means for connecting various permutations of said resistors into said third arm of said bridge;

means responsive to said third voltage for generating a control signal having a plurality of elemental voltages coded in accordance with the magnitude of said third voltage; and means for applying said control signal to said third connecting means to connect a permutation of resistors in said third arm in accordance with the presence of said elemental voltages.

4. In a system for adjusting an attenuation control resistor in a resistor-capacitor notch filter, said control resistor being constructed of material that can be anodized to increase its resistance value;

means for applying a sweep frequency signal to said filter to produce an output signal;

means for converting said output signal into a voltage varying signal which varies in accordance with 20 times the logarithm to the base 10 of the ratio of the output signal to the input sweep frequency signal;

means responsive to said voltage varying signal for storing a signal which represents the maximum value of said voltage varying signal;

means responsive to said stored signal for producing a control signal having a plurality of elemental voltages coded to be representative of a factor by which the attenuation control resistor must be increased to bring said voltage varying signal to a predetermined value;

a Wheatstone bridge having a first arm with a variable resistor set to a value equal to the resistance of said control resistor, said bridge having an opposed programmable resistance second arm which is programmed in accordance with said control signal, said bridge having a third constant resistor arm connected across first ends of said first arm and said second arms;

means connectable to said attenuation control resistor for anodizing and increasing the resistance of said control resistor;

means for alternately connecting said attenuation control resistor to (1) said anodizing means and (2) the second ends of said first and second arms;

means for energizing said Wheatstone bridge; and means actuated in response to an increase in resistance of said control resistor to balance said Wheatstone bridge for interrupting said anodizing means.

5. In a circuit for controlling the rate at which a resistor is anodized to increase its resistance to a predetermined value:

bridge means, including a detector and a measuring arm for producing an output voltage to indicate the extent which a resistance connected across said measuring arm differs from said predetermined value;

first means for connecting the resistor to be anodized across the measuring arm of said bridge;

a first Schmitt trigger connected across the detector of said bridge and operated upon the voltage across the detector reaching a first predetermined value for producing a first output signal;

a second Schmitt trigger connected across the detector of said bridge and operated upon the voltage across the detector reaching a second predetermined value for producing a second output signal;

means for supplying an anodizing current at a first predetermined rate in response to the first output signal and at a second predetermined rate, in response to the second output signal;

second means for connecting the resistor to be anodized to said current supply means; and means for operating said first and second connecting means alternately.

6. A circuit as set forth in claim 5, in which said bridge means three adjustable resistive arms settable to preselected values, each of which comprises:

a plurality of serially connected resistors arranged in groups of four resistors each, the resistors in each respective group having values which bear the relationship 1:2:2:4 and which may be selectively combined to represent a numerical digit, the resistors in the different groups having values which differ by a factor of 10 from the next adjacent group;

a plurality of groups of relays corresponding in number to said resistors, each having normally closed contacts connected across each of said serially connected resistors to provide shunt paths connected around said resistors; and control means for selectively actuating different permutations of relays in each group of relays and opening the associated contacts to place the corresponding resistors in series combination representative of a multi-digit number.

7. A programmable Wheatstone bridge as set forth in claim 6, in which:

said control means includes a manually actuated switch settable in 10 digit positions, and means responsive to each actuation of said switch into each of said position for energizing a permutation of said associated group of relays to place a permutation of resistors in series combination having a sum representative of the digit selected by the switch.

8. A programmable Wheatstone bridge as set forth in claim 6, in which:

said control means includes the readout of a digital electrical meter and means responsive to each digit displayed in each digit position of said meter for energizing a permutation of said associated group of relays to place a permutation of resistors in a series combination having a sum representative of the digit displayed on the meter.

9. A method of producing a control signal indicative of the variation of the notch depth attenuation of a notch filter from a preselected value, comprising the steps of:

impressing an alternating electrical signal having a frequency which varies periodically through the operating range of the filter, upon the input of said filter;

generating a first DC signal which varies in proportion to the output voltage level of said filter;

generating a second DC signal which varies in proportion to the input voltage level of said filter;

generating a third signal equal to the logarithm to the base 10 of the ratio of the first DC signal to the second DC signal;

amplifying the third signal by a factor of minus 20;

storing the amplified signal;

generating a standard signal which is numerically equal to said preselected value of attenuation; and subtracting the amplified signal from the standard signal to produce a control signal indicative of the variation of the notch depth attenuation.

10. A method of adjusting the value of an anodizable attenuation control resistor in a notch filter to change the notch depth attenuation of the filter to a preselected value, comprising the steps of:

impressing an alternating electrical signal having a frequency which varies periodically through the operating range of the filter, upon the input of said filter;

generating a first DC signal which varies in proportion to the output voltage level of said filter;

generating a second DC signal which varies in proportion to the input voltage level of said filter;

generating a third signal equal to the lorarithm to the base 10 of the ratio first DC signal to the second DC signal;

amplifying the third signal by a factor of minus 20;

storing the amplified signal;

generating a standard signal which is numerically equal to said preselected value of attenuation;

subtracting the amplified signal from the standard signal to generate a control signal indicative of the deviation of the notch depth attenuation of the filter from the preselected value;

setting a first adjustable arm of a programmable Wheatstone bridge to a resistance value in accordance with said generated control signal;

setting a second opposed adjustable arm of the Wheatstone bridge to a value equal to the resistance of said attenuation control resistor;

setting a third adjustable arm, connected across first ends of said first and second arms, to a preselected constant value of resistance;

anodizing said attenuation control resistor;

alternately interrupting said anodization of said attenuation control resistor and connecting said last-mentioned resistor into the fourth arm of said bridge; and interrupting said anodization of said attenuation control resistor upon said bridge attaining a balanced condition.

References Cited

UNITED STATES PATENTS

| | | | |
|---|---|---|---|
| 3,204,120 | 8/1965 | Naken | 317—123X |
| 3,261,082 | 7/1966 | Maissel et al. | 29—610X |
| 3,319,162 | 5/1967 | Sattinger et al. | 324—57 |

EDWARD E. KUBASIEWICZ, Primary Examiner

U.S. Cl. X.R.

29—620; 324—62